(12) United States Patent  
Batten et al.

(10) Patent No.: US 12,153,852 B2  
(45) Date of Patent: Nov. 26, 2024

(54) ELECTRONICALLY READABLE DISPLAY FEATURES FOR A DIGITAL LICENSE PLATE

(71) Applicant: ReviverMx, Inc., Granite Bay, CA (US)

(72) Inventors: Dean Batten, North Bend, WA (US); Prashant Dubal, San Jose, CA (US)

( * ) Notice: Subject to any disclaimer, the term of this patent is extended or adjusted under 35 U.S.C. 154(b) by 0 days.

(21) Appl. No.: 17/948,097

(22) Filed: Sep. 19, 2022

(65) Prior Publication Data

US 2023/0014678 A1    Jan. 19, 2023

Related U.S. Application Data

(63) Continuation of application No. 15/863,361, filed on Jan. 5, 2018, now Pat. No. 11,449,298.

(51) Int. Cl.

| | |
|---|---|
| *G06K 9/00* | (2022.01) |
| *B60R 13/10* | (2006.01) |
| *B60R 25/01* | (2013.01) |
| *B60R 25/20* | (2013.01) |
| *B60R 25/24* | (2013.01) |
| *B60R 25/30* | (2013.01) |
| *G06F 3/147* | (2006.01) |
| *G06K 7/14* | (2006.01) |
| *G06K 19/06* | (2006.01) |
| *G06Q 30/0645* | (2023.01) |

(Continued)

(52) U.S. Cl.

CPC ............ *G06F 3/147* (2013.01); *B60R 13/105* (2013.01); *B60R 25/01* (2013.01); *B60R 25/209* (2013.01); *B60R 25/24* (2013.01); *B60R 25/305* (2013.01); *G06K 7/1417* (2013.01); *G06K 19/06037* (2013.01); *G06Q 30/0645* (2013.01); *G06V 10/225* (2022.01); *G06V 20/62* (2022.01); *B60R 2325/108* (2013.01); *B60R 2325/205* (2013.01); *G06K 19/06028* (2013.01); *G06K 19/06112* (2013.01); *G06K 19/0614* (2013.01); *G06Q 30/0265* (2013.01); *G06Q 40/08* (2013.01); *G06V 20/625* (2022.01)

(58) Field of Classification Search

CPC ....... G06F 3/147; B60R 13/105; B60R 25/01; B60R 25/209; B60R 25/24; B60R 25/305; B60R 2325/108; B60R 2325/205; B60R 13/00; G06K 7/1417; G06K 19/06037; G06K 19/06028; G06K 19/06112; G06K 19/0614; G06Q 30/0645; G06Q 30/0265; G06Q 40/08; G06V 10/225; G06V 20/62; G06V 20/625; B60Q 1/26; G09F 21/048

See application file for complete search history.

(56) References Cited

U.S. PATENT DOCUMENTS

| | | | |
|---|---|---|---|
| 9,007,193 B2* | 4/2015 | Boston | ................ G08G 1/017 |
| | | | 705/14.62 |
| 2013/0006775 A1* | 1/2013 | Jordan | ................ G08G 1/20 |
| | | | 705/14.62 |

(Continued)

*Primary Examiner* — Xin Jia

(74) *Attorney, Agent, or Firm* — Karima Gulick

(57) ABSTRACT

A vehicle information display system includes a digital license plate attachable to a vehicle and having a display able to present electronically readable visual information. This electronically readable visual information is usable to facilitate provision of services, including but not limited to vehicle rental or providing vehicle access to authorized service providers.

27 Claims, 8 Drawing Sheets

(51) Int. Cl.
  *G06V 10/22* (2022.01)
  *G06V 20/62* (2022.01)
  *G06Q 30/0251* (2023.01)
  *G06Q 40/08* (2012.01)

(56) References Cited

U.S. PATENT DOCUMENTS

2015/0039365 A1* 2/2015 Haque .................... G08G 1/017
  705/7.13
2019/0213931 A1* 7/2019 Brubaker ............. B60Q 1/2607

* cited by examiner

ELECTRONICALLY READABLE DISPLAY FEATURES FOR A DIGITAL LICENSE PLATE

RELATED APPLICATIONS

This application is a continuation of pending U.S. Non-Provisional application Ser. No. 15/863,361, which in turn claims the benefit of U.S. Provisional Application Ser. No. 62/547,477, filed Aug. 18, 2017. The application is incorporated herein by reference for all purposes.

TECHNICAL FIELD

The present disclosure generally relates to a digital license plate with an associated information presentation system. More particularly, a system allowing for activation or presentation of services using an electronically readable visual indicator such as a QR code is provided.

BACKGROUND AND SUMMARY

Transportation vehicles are heavily regulated by governments, requiring license plates, registration stickers, and payment of a many types of usage of regulatory fees.

One potential apparatus for creating, storing, and processing vehicle data is available in conjunction with dynamic display that presents vehicle identification and registration information and can be arranged on the exterior of a vehicle. For example, U.S. Pat. No. 9,007,193, and pending published US Patent application US20130006775, both assigned to ReviverMX, describe a dynamic display that improves updateability of vehicle identification and registration information by use of a digital license plate.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
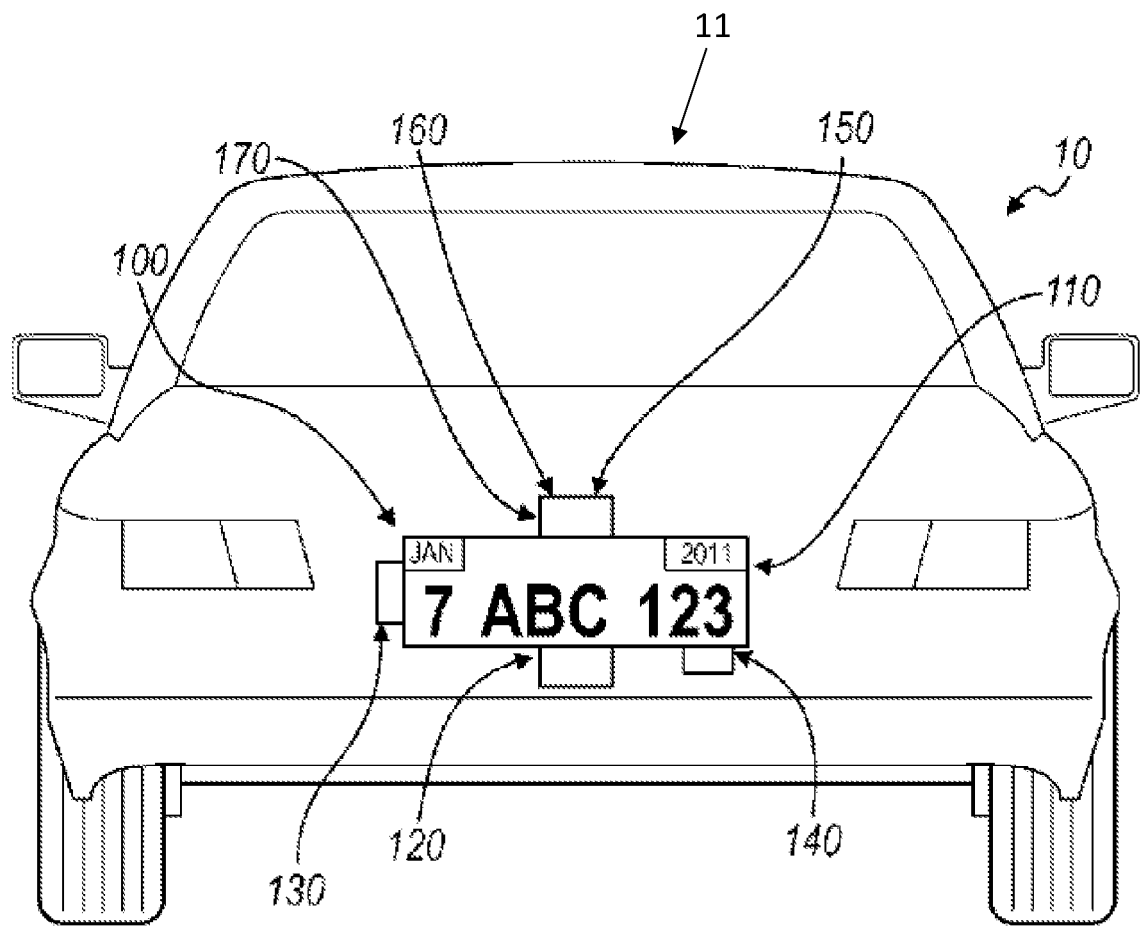
FIG. 1 illustrates one embodiment of a digital license plate system.

The digital license plate system 11 is preferably used for registered vehicles such as personal cars, trucks, motorcycles, rental cars, corporately-owned cars, or any other suitable type of vehicle. The display system 100 functions to render identification, insurance status, expiration date, registration, or other information of the vehicle 10 that is preferably provided by an official authority, such as a Department of Motor Vehicles (DMV). Preferably, the processor 120 renders the identification and/or registration information of the vehicle 10 on the display 110 such that a state vehicle code is followed, such as the size and dimension of the displayed area, the content, size, and lettering style of the information, and the visibility and reflectivity of the display 110. Preferably, the processor 120 renders content on the display 110 such that the state vehicle code of the state in which the vehicle 10 is registered is followed; alternatively, such as in the embodiment of the invention that incorporates a location sensor (such as a GNSS receiver), the processor 120 may render content on the display 110 such that the state vehicle code of the state in which the vehicle is located is followed. The display system 100 preferably functions to display a message in addition to the vehicle identification and/or registration information. The message is preferably provided by an advertiser, for example, an advertiser that is substantially unrelated to the user. The subject matter of the advertisement provided by the advertiser may be substantially unrelated to the driver and/or owner of the vehicle 10, and the advertisement may be substantially unrelated to the vehicle 10. Alternatively, the advertisement may be related to a demographic to which the driver and/or owner of the vehicle 10 belongs or to any other suitable characteristic of the driver and/or owner of the vehicle 10. The advertisement may also be selectable by the driver and/or owner of the vehicle 10, for example, via the Internet on a personal computer, via the internet on an internet-capable mobile phone, or via any other suitable method. The advertisement may also be substantially related to the vehicle 10, for example, a display system mounted to a Porsche may display advertisements that are targeted at a demographic with a brand affinity toward Porsches. The advertisements may be substantially related to the location of the vehicle 10, for example, if the vehicle 10 is traveling within the vicinity of a venue, an advertisement for the venue may be shown. Alternatively, the message may be provided by a law enforcement agency, for example, an emergency broadcast regarding a missing person (for example, an Amber or an Elder alert). Furthermore, if the vehicle 10 is reported stolen, the message may indicate that the vehicle 10 is stolen, thus allowing parties external to the vehicle to identify the vehicle 10 as such.

Alternatively, the message may be any suitable type of message and may be controlled by any suitable party, for example, an official organization (for example, the DMV), the driver of the vehicle 10, the owner of the vehicle 10, a third party unrelated to the vehicle 10, or any other suitable party. In a first example, the message may include additional details related to the vehicle 10, including the model of the vehicle 10, the smog check results of the vehicle 10, maintenance issues of vehicle 10, or any other suitable type of information related to the vehicle 10. In a second example, the message may include details related to the driver of the vehicle 10, including organizations that the driver supports or belongs to (for example, the Girl Scouts, the San Francisco Giants baseball team, or a political party), a cause that the driver supports (for example, People for the Ethical Treatment of Animals (PETA) or cancer awareness), the demographic of the driver, or any other suitable type of information related to the driver. In this second example, the message may also include official details regarding the driver; for example, the message may indicate that the driver is a doctor or a law enforcement officer, allowing people outside the vehicle 10 to direct requests to the driver when his services are desired. Official details may also include details relating to the driving history of the driver; for example, if the driver has an imperfect driving record, a notification may be rendered on the display in order to warn others in the vicinity of the vehicle. In a third example, the message may include notifications for drivers in the vicinity of the vehicle 10, for example, traffic information or weather forecasts. In a fourth example, the message may include details regarding the owner of the vehicle. This may be particularly useful when the vehicle 10 is a member of a fleet of cars, for example, a car rental agency, a moving truck rental agency, a government fleet, or any other suitable type of fleet. The message of the fourth example may indicate which fleet the vehicle 10 belongs to; this information may be used to identify vehicles, to advertise regarding the fleet (for example, if the vehicle 10 belongs to a rental car agency, the message may include an advertisement or a message for that particular rental car agency), or for any other suitable purpose. However, the message may be of any other suitable type of message.

The display system 100 is preferably powered by a power source. The power source is preferably a power source of the vehicle 10, such as the accessories battery of the vehicle 10, the engine of the vehicle 10, or any other suitable power source of the vehicle 10. Alternatively, the display system 100 may include and be powered by a power source that is substantially independent from a power source of the vehicle 10. The power source of the display system 100 is preferably a battery, but may alternatively be a solar panel, wind generator, or any other suitable type of power source or combination of power sources. Yet alternatively, the display system 100 may include a power source that is rechargeable and coupled to a power source of the vehicle 10 that stores power from the vehicle 10 while the vehicle 10 is in operation and/or the ignition of the vehicle 10 is on. In this variation, the power source of the display system 100 allows for power generated while the vehicle is in operation to be used at a later time by the display system 100. However, the display system 100 may be powered using any other suitable method and/or arrangement.

The display 110 functions to display content, wherein content includes at least one of the identification information of the vehicle 10, registration information of the vehicle 10, and a message. The display 110 is operated by the processor 130 in one of the three operational modes. The display 110 is preferably of a substantially low power display, such as an LED display, an LCD display, an e-ink display, an organic LED display, an interferometric modulator display (iMoD), a display that uses electrophoretic deposition (EPD), a cholesteric liquid crystal display (ChLCDs), or any other suitable display. The display 110 may alternatively be a combination of the above display types. The display 110 preferably also has a substantially wide range of viewing angles. The display 110 is preferably also substantially thin, allowing the display 110 to replace existing license plates on the rear and/or front exterior of the vehicle. Similarly, the display 110 is preferably of a width, height, and/or aspect ratio that is/are substantially similar to existing license plates. Alternatively, the display 110 may be substantially different than existing license plates (for example, in the case of the relatively narrow height of European license plates, the display 110 may be of a substantially different height). However the display 110 may be of any other suitable dimension.

The display 110 may also include a backlight. The backlight functions to control the light intensity of the information displayed by the display 110. The backlight preferably includes a plurality of degrees of light intensity. The processor 130 may select the degree of light intensity based upon the mode of operation. The processor 130 may also select the degree of light intensity based upon ambient light levels proximal to the display 110. For example, the degree of light intensity may be higher during the day and lower during the night. In this variation, the display system 100 also includes a light sensor to detect the level of ambient light. The degree of light intensity of the display system 100 may also be selected based on the preferences of the driver, a law enforcement officer, or any other suitable party. However, the degree of light intensity of the display system 100 may be selected based on any other suitable criteria. The backlight may be a set of lights located substantially on the perimeter of the display 110 and that are directed toward the display 110. Alternatively, the backlight may be located substantially behind the display 110 and provide light from behind the display 110. However, the backlight may be of any other suitable arrangement. The backlight may be a series of low-power light sources, such as LEDs, but may alternatively be any other type of light source. Alternatively, the display may include a light-reflective surface that functions to illuminate the display 110 with reflected light. The light-reflective surface may be a mirror or any other suitable type of reflective material. The light-reflective surface may also be of a retroreflective material that reflects light back in the direction of the light source. The light-reflective surface may also be combined with a light source to more effectively illuminate the display 110, for example, the transflective materials used on freeway signs. However, any other suitable material or method may be used to illuminate the display.

The vehicle speed sensor 120 functions to detect the speed of the vehicle 10. The vehicle speed sensor 120 is preferably a sensor that measures the actual velocity and/or acceleration of the vehicle 10, such as an accelerometer coupled to the vehicle 10 or a tachometer coupled to the drivetrain of the vehicle 10 and which measures the number of revolutions of a drivetrain component, such as a wheel, for a period of time in order to determine the speed of the vehicle 10. In a second variation, the vehicle speed sensor 120 couples to the speedometer of the vehicle 10 and/or an onboard computer of the vehicle 10; in this configuration, the speed sensor 120 functions to transmit information gathered by the speedometer and/or the onboard computer to the processor 130, rather than measure the vehicle speed directly. However, the vehicle speed sensor 120 may be any other suitable type of sensor that determines the actual speed and/or acceleration of the vehicle 10, including but not limited to a GNSS receiver or inertial navigation system. Alternatively, the vehicle speed sensor 120 may be a sensor that measures the relative velocity and/or acceleration of the vehicle, for example an ultrasonic sensor or an infrared sensor that determines the speed of the vehicle relative to another object. The other object may be a stationary portion of the road or a nearby vehicle. However, the vehicle speed sensor 120 may determine the speed of the vehicle 10 using any other suitable method or sensor type.

The processor 130 functions to render content on the display 110 based upon the operational mode of the display system 100: a first mode, wherein a first content is rendered on the display 110 at a first power consumption level, the first content including identification information of the vehicle 10 and/or registration information of the vehicle 10; a second mode, wherein a second content is rendered on the display 110, the second content including a message and possibly including identification information of the vehicle 10 and/or registration information of the vehicle 10; and a third mode, wherein content is rendered on the display 110 at a second power consumption level that is less than the first power consumption level. Preferably, content rendered in the third operational mode includes the identification and registration information of the vehicle 10. In a variation of the display system 100, content rendered in the third operational mode includes a message in addition to the identification and/or registration information of the vehicle 10. However, content rendered on the display 110 in the third operational mode may include any other information or messages or any combination thereof.

The processor 130 is preferably coupled to the vehicle speed sensor 120. As mentioned above, the speed determined by the vehicle speed sensor 120 may be the actual speed of the vehicle 10 or may alternatively be the speed of the vehicle 10 relative to another object (for example, a neighboring vehicle). The processor 130 preferably selects the operational mode of the display system 100 based on the speed and power state of the vehicle 10. However, a device other than the processor, such as the onboard computer of the vehicle 10, a law enforcement officer, a second processor connected to a remote server, or any other suitable device or institution may select the operational mode of the display system 100. The processor 130 preferably operates the display 110 in the first and second operational modes when the vehicle 10 is on, and the processor preferably operates the display 110 in the third operational mode when the vehicle 10 is off. The vehicle 10 is preferably considered "on" when the driver turns any portion of the vehicle 10 on. In many cars, there is a plurality of "on" states, for example, a first "on" state in which basic functionality, such as opening and closing windows, is allowed; a second "on" state in which more advanced and/or higher-power functionality, such as ventilation systems or the sound system, is allowed; and a third "on" state in which the vehicle may be driven. The vehicle 10 may be considered "off" otherwise. In the "off" state, certain portions of the vehicle may still be "on", for example, security sensors, key proximity sensors (such as keyless entry), or any other type of substantially-low-power functionality. Alternatively, in some embodiments the vehicle 10 may be considered "on" when the ignition is on and considered "off" when the ignition is off, regardless of any other functionality that the vehicle may provide to the driver. Yet alternatively, the vehicle 10 may be considered "on" when the presence of a person is detected within the vehicle and "off" when there is no one within the vehicle. The vehicle 10 may also be considered off when the emergency brake or transmission parking brake of the vehicle 10 is engaged, regardless of the state of the ignition or presence of a person within the vehicle 10. However, the vehicle may be considered "on" and "off" using any other suitable criteria. The processor 130 preferably operates the display 110 in the first operational mode when the vehicle 10 is at a first speed and preferably operates the display 110 in the second operational mode when the vehicle 10 is at a second speed lower than the first speed. The second speed is preferably substantially zero speed, or substantially close to zero speed. This allows for identification and/or registration information of the vehicle 10 to be substantially visible while the vehicle 10 is in motion (the first speed), as shown in FIG. 1. This allows any party external to the vehicle 10 to visually access the information rendered on the display 110 in a manner similar to that used to visually access information on a static (or stamped) license plate. In one variation, the processor 130 operates the display 110 in the second operational mode and renders the second content on the display 110 when the vehicle 10 is on and at the second speed, wherein the second speed is preferably zero speed or a substantially slow speed, such as when the vehicle is moving slowly through heavy traffic. Because the message depicted in the second mode takes up a portion of the display area of the display, the identification and/or registration information also depicted may consume a smaller portion of the display area in the second operational mode as compared to the first operational mode. Because the identification and registration information is depicted in a is smaller size on the display 110 when a message is displayed concurrently with the vehicle 10 information, the visibility of the identification and registration information may be less in the second operational mode than in the first operational mode. Alternatively, the identification and/or registration information rendered on the display 110 in the second operational mode may be of the same or similar format (for example, size and layout) as in the first mode, but the message may be rendered on the display to overlap the identification and/or registration information. This may also result in reduced visibility of the identification and/or registration information of the vehicle 10. Therefore, the message may be displayed only under such conditions as when the vehicle is stopped or nearly stopped so that decreased visibility of the identification and/or registration information does not occur when the vehicle 10 is moving at a substantial speed; however, the additional functionality of displaying the message when the vehicle is at the second speed still remains. Additionally, the message may provide an undesired distraction for a party outside of the vehicle 10 while the vehicle 10 is in motion, and thus, by only displaying the message while the vehicle is stopped or nearly stopped, the possibility of distraction may be substantially reduced. However, the processor 130 may alternatively operate the display 110 in the first and second operational modes at any other suitable speed arrangement. In a variation of this, the display system 100 may enhance legibility of the information for a party outside of the vehicle 10 by horizontally mirroring content rendered on the display 110 when the display 110 is mounted on the front exterior of the vehicle 10; in this variation, content rendered on the display may be read in the correct orientation by a party viewing the display 110 in a rearview or side mirror of a second vehicle located ahead of the vehicle 10. However, the processor may render content on the display 110 by any other means or arrangement such that distraction caused by the display 110 is reduced and legibility of the displayed content is improved.

As described above, the processor 130 preferably functions to operate the display 110 in the third operational mode when the vehicle 10 is off. The third operational mode preferably displays identification and registration information of the vehicle 10 at a second lower power consumption level that is less than the first power consumption level. In a variation of this, a message is rendered on the display 110 in addition to the identification and registration information of the vehicle 10, although any one or combination of a message, identification information of the vehicle 10, registration information of vehicle 10, or any other information may be rendered on the display 110 when in the third operational mode. When the vehicle 10 is off, the power available to the display system 100 may be less than when the vehicle is on. For example, in the variation wherein the display system 100 obtains power from a power source of the vehicle 10, the display system 100 may be utilizing energy that was stored from another period of time when the vehicle was on. Thus, there is a limited supply of power, and by operating the display 110 at a lower power consumption level in the third operational mode than in the first and/or second operational modes while the vehicle is off, the length of time that content may be rendered on the display 110 may be increased for a given amount of energy available to the display system 100.

The operation of the display 110 in the third operational mode may reduce the power consumption of the display system 100 in a variety of arrangements. In a first variation, the display 110 may be turned off at a first time and turned on at a second time. The display 110 may be timed to cycle on and off at specific time intervals, for example, every five minutes. The driver, the owner, or any other suitable party may adjust the intervals. This allows the display 110 to be turned off for a length of time and turned on for another length of time. The length of time that the display 110 is turned off is preferably substantially longer than the length of time that the display 110 is turned on, which substantially decreases the power consumption of the display 110. In a further variation, when in the third operational mode, content may be rendered on the display 110 in colors that require less power to display, as compared to when operating in the first operational mode. However, the processor may operate the display 110 by any other means that reduces power consumption of the display 110 when in the third operational mode, as compared to the first operational mode. Furthermore, the processor 130 may reduce the power consumption level of the processor 130 when in the third operational mode, for example, by reducing clock speed, shutting down auxiliary functions such as transmitting data to and/or receiving data from the communications device 140, or any other method to reduce power consumption of the processor 130. When the processor 130 operates the display in the third operational mode, the light intensity of the display 110 may be substantially identical to the light intensity of the first and/or the second operational modes. Alternatively, because the vehicle 10 is presumed to be stationary when off (a possible exception to this presumption would be when the vehicle 10 is being towed) and the party to which message and/or identification information and/or registration information is to be shown is substantially proximal to the vehicle 10, the light intensity of the display 110 may be substantially less in the third operational mode than in the first and/or second operational modes. However, any other suitable light intensity may be used in the third operational mode.

In a second variation, the display may be continuously on when operating in the third operational mode but at a substantially lower light intensity than in the first and/or second operational modes. In one example, the backlight of the display 110 may be at the lowest light intensity in the third mode. The method and arrangement to decrease the power consumption of the display 110 in the third operational may alternatively be a combination of the above variations or any other suitable method or arrangement, including use of bistable displays that can be externally illuminated, with illumination levels being adjustable.

The processor 130 may alternatively operate the display 110 in a fourth operational mode. The fourth mode may be determined by communication through the communication device 140. In a first example, the communication device 140 may communicate with a law enforcement agency and may indicate to the processor 130 that the vehicle 10 has been stolen. The processor 130 may then operate the display 110 in a fourth operational mode in which a notification that the vehicle 10 is a stolen vehicle is rendered on the display 110. However, the fourth mode may alternatively be of any other suitable type and actuated by any other suitable method.

The communication device 140 functions to allow content, information, and/or data to be transferred to and from the display system 100. The communication may be conducted with an official organization (such as a DMV office or a law enforcement agency), a content database, the driver of the vehicle, the owner of the vehicle, or any other suitable party. The communication device may transmit and/or receive information regarding vehicle identification and/or registration information, vehicle maintenance information, driver information, vehicle location information (for example, in the variation of the display system 100 that includes a GNSS or GPS location receiver or accesses GNSS/GPS location services), updated advertisements, or any other suitable type of information. The communication device 140 is preferably of a wireless communication type, for example, one that communicates with cellular phone towers, Wi-Fi hubs, or any other suitable type of wireless communication. However, the communication device 140 may be a wired communication device. In this variation, updated information is transferred when the display system 100 is "plugged in" to an updating device, for example, a computer at a maintenance facility, at a DMV office, or any other suitable location, or another vehicle and/or display system 100 that has wireless communication capabilities. The communication device 140 may also include a communication processor that functions to interpret communications to and/or from the display system 100. The communication processor is preferably separate from the processor 130, but may alternatively be the processor 130. The communication processor may function to encrypt and/or decrypt communications to and/or from the display system 100. The encryption/decryption may be any one of a variety of authentication and encryption schema. For example, cryptographic protocols such as Diffie-Hellman key exchange, Wireless Transport Layer Security (WTLS), or any other suitable type of protocol. The communication processor may also function to encrypt data to encryption standards such as the Data Encryption Standard (DES), Triple Data Encryption Standard (3-DES), or Advanced Encryption Standard (AES). However, the communication device 140 may allow any other suitable type of communication and may be of any other suitable arrangement.

The communication device 140 may receive content, information, and/or data from a content database. Preferably, the content database is arranged substantially remote from the processor 130. The content database also preferably contains content provided by an institution, for example, an advertiser, a school, a record company, or a sports team or venue; content provided by the institution preferably includes advertisements. Alternatively, the content database may contain content provided by the driver and/or owner of the vehicle 10, for example, a message composed by the owner of the vehicle 10 congratulating a child upon graduation from high school. However, any other suitable party may provide content to the content database, and the content database may include a combination of advertisements from one or more institutions and personal messages from one or more individuals. In a first example, content on the content database is accessed by the processor 130 via the communication device 140 and stored on the storage device 150. Preferably, the storage device 150 is arranged substantially proximal to the display 110, such as within the vehicle 10 or within a housing containing the display 110; however, the storage device 150 may be located remotely from the vehicle 10, such as on a hard drive connected to a remote server. In a second example, content on the content database is accessed via the communication device 140 in real time and then rendered on the display 110, thereby bypassing storage of content on the storage device 150. However, content from the remote message database may be accessed by any other means before being rendered on the display 110. In a third example, the storage device also functions as the content database, wherein content from at least one institution or individual, such as those listed above, may be stored on the storage device and also selected by the driver and/or owner of the of vehicle 10 to be rendered on the display 110. In this variation, the storage device 150 of the display system 100, also functioning as a content database, may be accessed by a second display system separate from the display system 100, such as a display system arranged on a second vehicle. However, any other suitable party may select the content to be rendered on the display 110 from the content database. Furthermore, content on the content database may be selected, accessed and/or modified by the driver and/or owner of the vehicle 10, or any other suitable party, via an interface. Preferably, the interface is internet-based and accessible via a web browser, for example, on a mobile smart phone or on a computer. In a first example, the driver and/or owner of the vehicle 10 may access interface with an internet-capable mobile phone, then log into the content database and select content (for example, a San Francisco Giants Baseball banner) he wishes to be rendered on the display 110. In a second example, the content database stores vehicle registration information, and upon the renewal of the registration of the vehicle 10, a DMV representative may access the content database via a computer equipped with the interface and then update the registration information of the vehicle 10 on the content database; the communication device 140 may then retrieve the updated registration information from the content database and the registration information subsequently rendered on the display 110 may reflect the renewal. Alternatively, the interface may be a handheld device that is hardwired, or physically "plugged in", to the display system 100. In this variation, the interface may or may not be removable from the display system 100. Furthermore, the interface may not couple to the content database via the communication device 140, but instead only provide the driver and/or owner of the vehicle 10, or any other suitable party, to access content already located on the display system 100, such as on the storage device 150 arranged substantially proximal to the display 110. For example, a law enforcement officer, upon pulling over the driver of the vehicle 10 for a traffic violation, may hook up to the display system 100 arranged on the vehicle 10 a device equipped with the interface, wherein the interface provides access to the current identification and/or registration information of the vehicle 10. However, the interface may permit access to any content contained in any other device coupled to the display system 110 and by any other means.

The communication device 140 may transmit data regarding the rendering of a particular content on the display 110. Preferably, an advertisement is included in the content rendered on the display 110, and the communication device 140 transmits data regarding the rendering of the advertisement on the display 110. This data may include, for example, how long the advertisement was displayed, when it was displayed, and where it was displayed. Alternatively, this data could be collected and/or stored by the processor 130, although it could be collected and stored by any other device or means. Preferably, this information is used to determine the magnitude or type of an award granted to the driver and/or owner of the vehicle 10. In a first example, if an advertisement for tickets to a baseball game featuring a given team is rendered on the display 110, the driver and/or owner of the vehicle 10 may receive a monetary award commensurate with the length of time that the advertisement was rendered on the display 110; alternatively, the owner and/or driver of the vehicle 10 may receive one or more tickets to a baseball game featuring this team in return for displaying the advertisement in an area with a relatively low attendance at baseball games. However, any other method may be used to grant an award of any other type to the driver and/or owner of the vehicle 10 in return for the rendering of content on the display 110.

The sensor for determining the proximity of the vehicle 10 to a second vehicle functions to indicate to the processor 120 to modify content rendered on the display 110. The processor 120 preferably renders a message, such as an advertisement, on the display 110 when the second vehicle is substantially proximal to the vehicle 10 (such as in the second mode); the processor 120 preferably renders the identification and registration information of the vehicle 10 on the display 110 when the sensor detects that no second vehicle is substantially proximal to the vehicle 10 (such as in the first mode or the third mode). The sensor may be a RADAR detector, a LIDAR detector, an IR transmitter-photoresistor pair, a camera, or any other suitable device configured to detect the proximity of the vehicle 10 to a second vehicle. In the embodiment of the sensor that is a camera, the camera may be configured to detect identification information of the second vehicle (such as the license plate number of the second vehicle); this information may be used to determine the owner of the second vehicle and obtain information relating to the owner of the second vehicle. The processor 120 may then modify content rendered on the display 110 based upon the demographic of the owner of the second vehicle, such as by displaying an advertisement for discount prescription medications if the owner of the second vehicle is determined to be at least sixty years of age; by displaying an advertisement for a women's fashion store if the owner of the second vehicle is determined to be female; or by displaying driver information if the second vehicle is determined to be owned by or used by a law enforcement agency. In this example, identification information of the second vehicle may be transmitted to a database of vehicle identification information, wherein the database returns information about the owner of the second vehicle 10, such as age, ethnicity, or gender; the database may be maintained by an entity such as a DMV or the American Automobile Association (AAA). In another embodiment, if the second vehicle is equipped with a digital license plate, information can be directly requested and transmitted back to the first vehicle's digital license plate 202. Alternatively, the camera may be configured to determine directly the demographic of the driver of the second vehicle (for example, by matching the driver to a specific ethnicity by with facial recognition software) or the response of the driver of the second vehicle to a message rendered on the display 110. In the latter example, the response of the driver of the second vehicle may be used to pick an alternative message that may produce a more favorable response if the initial response is negative, or to choose a similar message if the first response is positive. Furthermore, in the embodiment in which the sensor is a camera, the camera may be used to measure the level of ambient light substantially proximal to the vehicle 10 such that content may be rendered on the display at an appropriate light level; for example, the brightness of the display may increase if the camera determines a high level of sunlight near the vehicle 10. However, the sensor may detect any other information relevant to the second vehicle and indicate to the processor 120 to modify content rendered on the display based upon any other variable.

Figure 2:
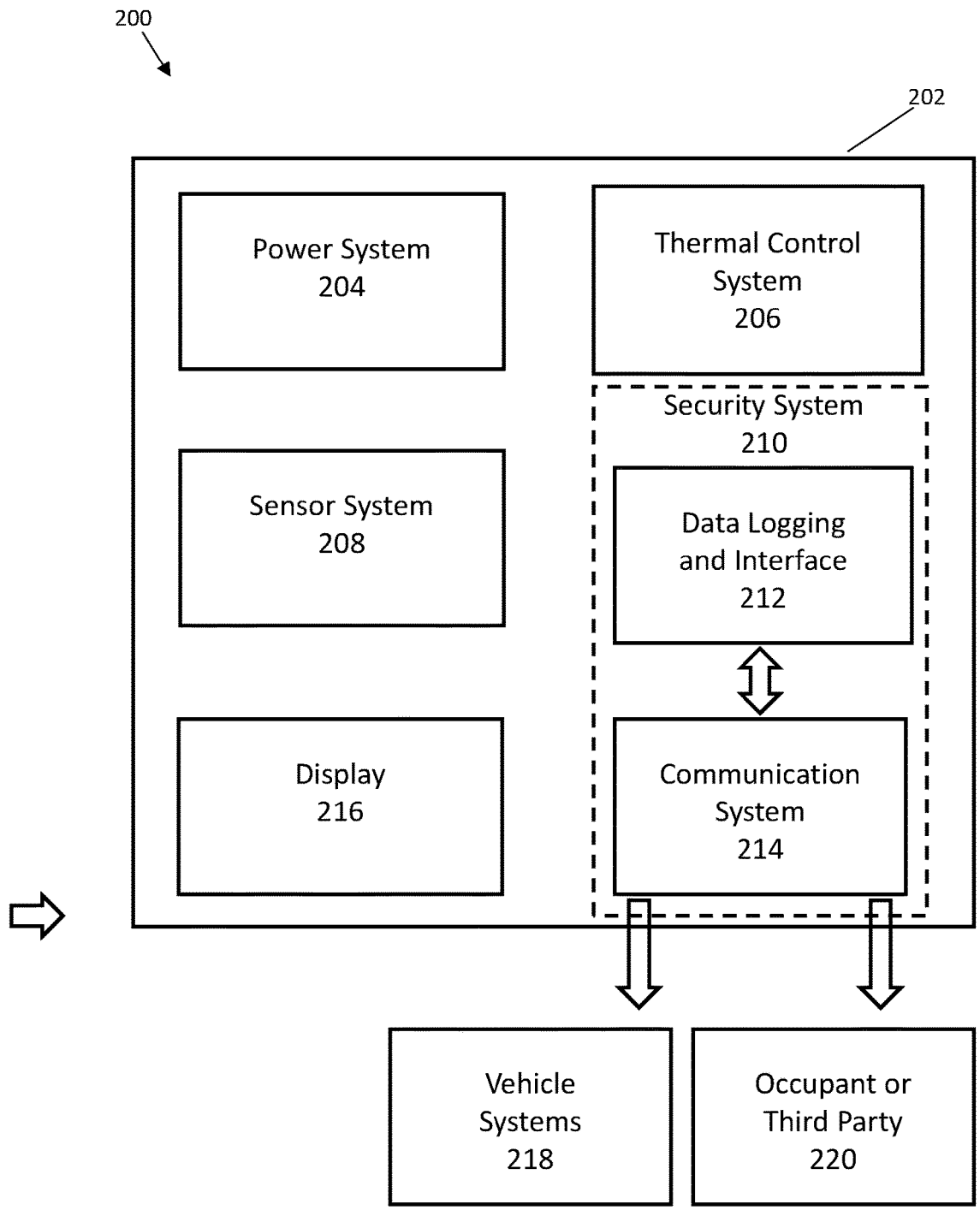
FIG. 2 illustrates various systems in a digital license plate system.
Figure 3:
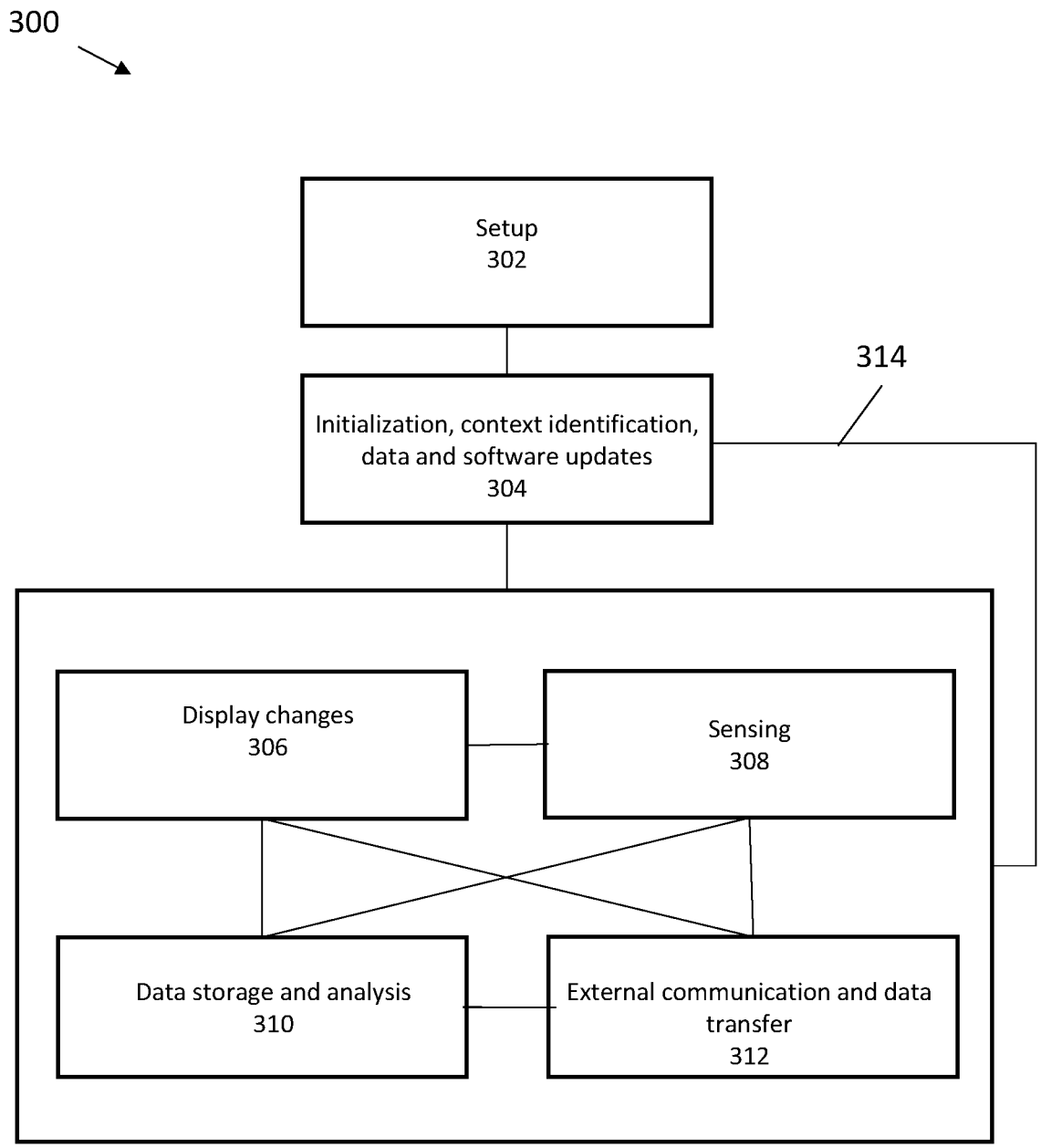
FIG. 3 illustrates operation of a digital license plate system.
Figure 4:
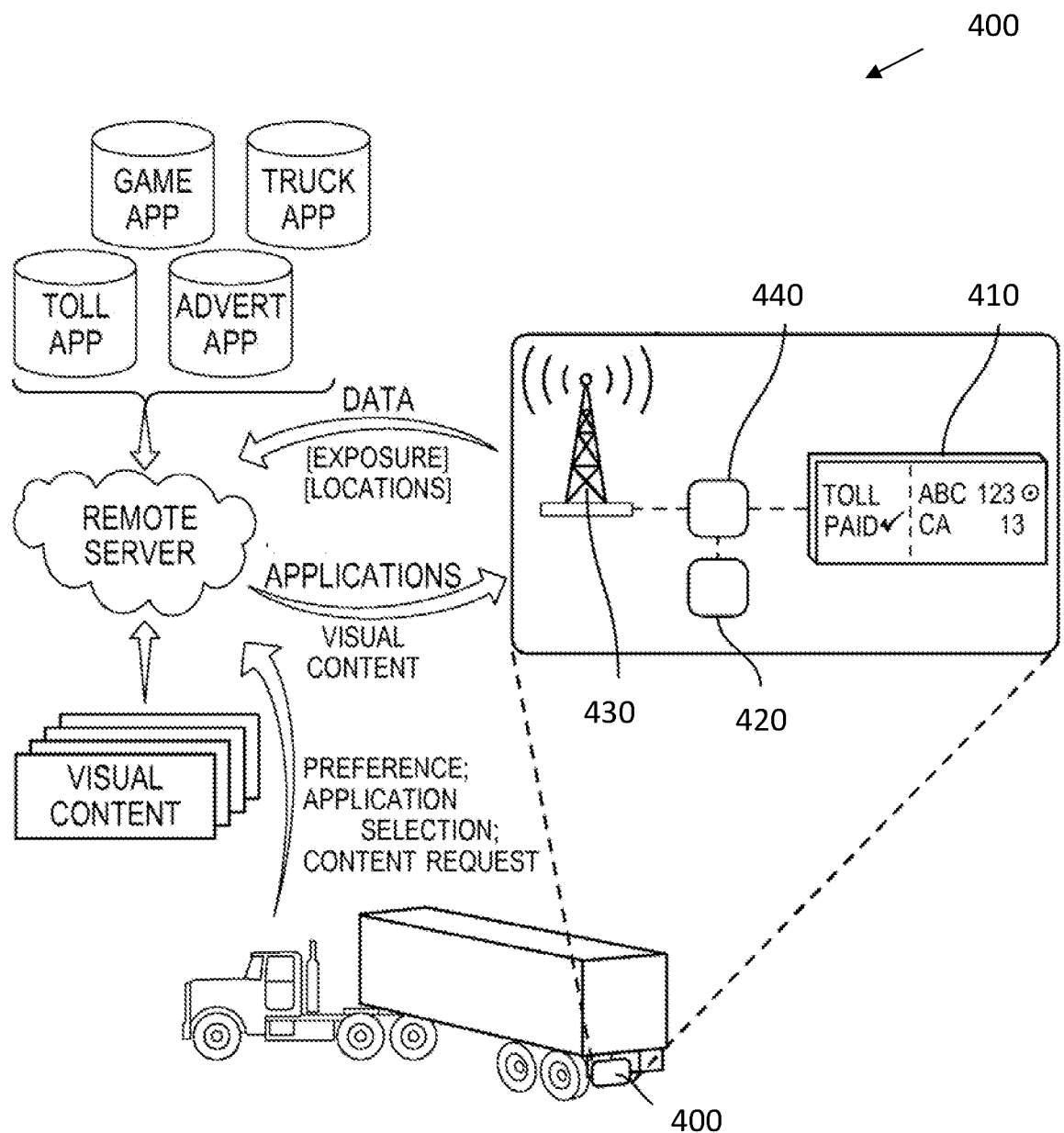
FIG. 4 illustrates external data communication in a digital license plate system.

FIG. 2 illustrates various systems, sub-systems, or modules that can be incorporated into a digital license plate system 200, along potential interacting agents such as vehicle systems 218, vehicle occupants, or third party persons, vehicles, other digital license plates or external automated systems 220. In this Figure, a digital license plate 202 can be mounted on a vehicle. Systems within the digital license plate can include, but are not limited to, a power system 204, thermal control system 206, and sensor system 208. An electronic security system 210 limits unauthorized access to data logged and distributed via a data logging and interface system 212, or any received/transmitted communications through communication system 214. Received data can be used to determine or update information presented by display 216. FIG. 3 illustrates a method for operation of one embodiment of a digital license plate system. After an initial setup 302 to register and link a digital license plate to a specific vehicle, the digital license plate can be ready for initialization 304 on vehicle startup (or alternatively, on vehicle stop), and can use timers or sensors to help identify context, location, or display presets for the digital license plate. Data uploading/downloading can be initiated, and any firmware/software updates completed. In normal operation, changes 306 to the display can occur in response to sensed data 308, from data storage or analysis system 310, or as a result of external communication and data transfer 312. Similarly, sensed or stored data can be transmitted or received, and the sensors activated, deactivated, or sensor data analyzed based on internal triggers or externally received data. When a vehicle stops, or in response to a timing or other suitable trigger, data can be transferred (via line 314) back to the initialization step 304 FIG. 4 illustrates a representative data transfer and storage system 400 including both vehicle mounted and external apparatus/software for interacting with a digital license plate such as discussed herein. As shown in FIG. 4, a preferred digital license plate system 400 for rendering content on a vehicle includes a display 410, a memory 420, a communication module 430, and a processor 440. The display 410 is configured to mount adjacent an exterior surface of a vehicle. The memory 420 is configured to store a plurality of executable applications including a vehicle identification application and an application elected by a user. The communication module 430 is configured to download the user-elected application to the memory 420. The processor 440 is configured to selectively execute applications to control visual content rendered on the display 410, wherein the display 410 renders vehicle identification information when the vehicle identification application executes, and wherein the display 410 renders additional visual content when the user-elected application executes.

The digital license plate system 400 preferably functions to execute a plurality of applications, wherein the display 410 renders visual content specific to each application for viewing from outside a vehicle. When executing a vehicle identification application, the preferred system 400 preferably functions as a digital license plate by displaying a government-issued license plate number of the vehicle. However, when executing another (i.e. a user-elected) application, the preferred system 400 preferably functions as a toll payment, interstate trucking, messaging, advertising, gaming, news, alert, or other application by displaying visual content relevant or specific to the user-elected application. The vehicle identification application is preferably a default and/or preloaded application executable on the system 400, and additional applications are preferably elected by the user. The additional or user-elected applications are preferably downloaded from a remote server containing a plurality of available applications executable on the system 400 such that the user can customize the system 400 to perform certain functions and/or to display certain visual content, types of visual content, forms of visual content, etc. The preferred system 400 can then switch between displaying vehicle identification information and displaying additional visual content, types of visual content, forms of visual content, etc. specific to the user-elected application. The user can therefore select various applications from a set of available applications to enable certain functionalities of the system 100.

The memory 420 of the system 400 is configured to store executable applications, including the vehicle identification application and the application elected by the user. The memory 420 can preferably store additional user-elected applications, application-specific or application-related data (e.g., vehicle identification information, toll payment information, a user-defined personal message), user preferences (e.g., fonts, visual content types, power settings), or any other relevant information pertaining to the operation of the preferred system 400. In one variation of the preferred system 400, the memory 420 is preloaded with the vehicle identification application and vehicle identification information (e.g., a license plate number) that is unique to the vehicle and/or to the system 400. In this variation, the vehicle identification information is preferably unalterable.

The memory 420 is preferably in communication with the processor 440 such that the processor 440 can access application data and visual content from the memory 420, execute the application, and push visual content from the memory 420 to the display 410 for rendering. The memory 420 is preferably physically coupled to the processor 440 and arranged within a housing shared with the display 410 and the processor 440. Alternatively, the memory 420 can be arranged within the vehicle and remote from the display 410, such as adjacent or physically coextensive with an electronic control module (ECM) integrated into the vehicle. The memory 420 can alternatively be a remote memory coupled to a remote server, wherein the processor 440 accesses the remote memory via the communication module 430 in communication with the remote server. The memory 420 can alternatively be physically coextensive with memory incorporated into a mobile electronic device carried by the user, such as a smartphone or tablet. However, the memory 420 can be arranged in any other way relative to the display 410, and the memory 420 can be accessed over a wire, via wireless communication (e.g., Wi-Fi, cellular, Bluetooth, RFID), and/or through the communication module 430 in any other way or according to any other protocol.

The communication module 430 preferably accesses a remote server that stores a plurality of applications, wherein each application on the remote server can be selected by the user and subsequently downloaded to, uploaded to, installed on, or executed on the preferred system 400 to enable a particular function defined by each application, as shown in FIG. 2. In one variation of the preferred system 400, the remote server functions as an application store through which the user can access or buy applications, wherein the processor 440 accesses the remote server through the communication module 430 to download an application selected by the user. In this variation, personal user information and/or vehicle identification information is preferably used to automatically bill the user, a fleet manager, or any other entity associated with the vehicle for the purchase of the elected application. In one variation, the communication module 430 communicates directly with a remote server via a wireless communication protocol. In an example implementation, the communication module 430 communicates with the remote server over a cellular (e.g., 4G cellular) network and downloads the user-elected application over the cellular network. However, the communication module 430 can wirelessly communicate substantially directly with the remote server, such over Wi-Fi and a local area network connection, Bluetooth, satellite, or any other suitable type of short- or long-range wireless communication protocol. In another variation of the system 400, the communication module 430 communicates with the remote server through a wireless-enabled mobile device. In one example implementation, the communication module 430 includes a port configured to accept a physical wire connectable to a smartphone carried by the user, wherein the smartphone wirelessly accesses and pulls information from the remote server and subsequently uploads the information via the wired connection. In another example implementation, the communication module 430 communicates with a tablet computer over short-range wireless communication protocol (e.g., Wi-Fi, Bluetooth, RFID, near field communication (NFC), infrared), wherein the tablet computer communicates with the remote server via long-range wireless communication protocol (e.g., cellular, satellite) to transfer information from the remote server to the communication module 430. In these example implementations, the communication module 430 preferably receives application-related data from the mobile electronic device substantially in real time. Alternatively, the communication module 430 can receive application-related data substantially long after the mobile electronic device accesses and stores the application-related data locally. However, the communication module 430 can access and download user-elected application data and related visual content via any other communication protocol, through any other secondary or mobile electronic device, or in any other way.

The communication module 430 is preferably configured to receive data from the remote server, including the user-elected application, application-related data, and additional visual content. However, the communication module 430 can also transmit data to the remote server, such as vehicle location data, visual content exposure (e.g., how long visual content is rendered on the display 410, how many individuals read or noticed the visual content), a user preference, vehicle or vehicle occupant identification information, a local person, vehicle, or environmental condition, or any other relevant data or information. Such data is preferably stored on the memory 420 and transmitted to the remote server when a suitable connection is established (e.g., through a Wi-Fi-enabled mobile electronic device or according to a predefined system update schedule. However, the memory 420 can store any other data and the communication module 430 can send and/or receive any other relevant information to and/or from the remote server.

The processor 440 of the system 400 is configured to selectively execute applications to control content rendered on the display 400, including the user-elected application and the vehicle identification application. The processor 440 is preferably arranged within the housing that also contains the memory 420 and the display 400, though the processor 440 can alternatively be remote from the display 400, such as arranged adjacent or physically coextensive with an ECM of the vehicle. The processor 440 is preferably coupled to memory 420 and to the display 410 via a wired connection, such as a trace on a shared printed circuit board (PCB). However, the processor 440 can alternatively communicate with the memory 420 and/or display via a wireless or optical connection. Furthermore, the processor 440 can be physically coextensive with a processor of a mobile electronic device carried by the user. However, the processor 440 can be arranged in any other way, and the processor 440 can communicate with the memory 420 and/or display in any other way or according to any other protocol.

The processor 440 preferably handles transitions between applications and controls physical content rendered on the display 410. By selectively executing applications, the processor 440 can execute the vehicle identification application exclusively, the user-elected application exclusively, and/or the vehicle identification application and the user-elected application simultaneously. When executing the vehicle identification application, the processor 440 preferably accesses vehicle identification information stored on the memory 420 and handles rendering the vehicle identification information on the display 410. The processor 440 also preferably accesses necessary application and application-related data from the memory 420 when executing the user-elected application. The processor 440 can additionally or alternatively access relevant data directly from the remote server, such as via the communication module 430, to execute the application and select content to render on the display 410. The processor 440 preferably selectively executes the applications based upon the location of the vehicle, the proximity of the vehicle to a known or identified entity, an input from the user, an input from a known or identified entity outside of the vehicle, a user preference, a timer, a quality of a second local vehicle (e.g., child occupancy, a demographic of a driver, a driving record of a driver, the make and model of the second vehicle), or any other suitable trigger or input. A transition between two applications can be native to one or more applications, defined by the processor 440 outside of an application, set by the remote server, triggered by the user, or triggered by a second user or other entity outside of the vehicle. However, the transition between applications can be generated, defined, or set in any other way or by any other party.

In a variation of the system 400 in which a transition between applications is triggered by a party external the system 400 (e.g., the user, a second user, an external entity), the processor 440 preferably receives the trigger event through the communication module 430. In one example implementation, the communication module 430 includes a GNSS/GPS sensor, and the processor 440 transitions to a toll application when the communicate module estimates that the vehicle is within a specified range of a tollbooth. In another example implementation, the communication module 430 includes an infrared (IR) sensor, and the processor 440 transitions to the vehicle identification application when a police officer points an IR remote at the communication module 430. In yet another example implementation, the communication module 430 includes an input region (e.g., a physical switch, a touch screen) arranged within the cabin of the vehicle and accessible by the user, and the processor 440 transitions between applications based upon a user interaction with the input region (e.g., flipping the switch, selecting a touch screen input region). However, the trigger can be any other type of input provided or generated by any suitable user, individual, or entity.

In one variation of the system 400, the processor 440 executes the vehicle identification application that prompts the display 410 to render government-issued vehicle identification information. The display 410 preferably renders a government-issued license plate number when the processor 440 executes the vehicle identification application, though the display 410 can depict additional identification information, such as registration information, the name, permit, or driver's license number of a current occupant or driver, the license-issuing state, or a driving record of the current driver or owner of the vehicle. The license plate number or other identifier of the vehicle is preferably stored on a non-volatile, read-only portion of the memory 420 such that license plate number or other identifier cannot be changed once programmed onto the system 400. Alternatively, the license plate number or other identifier can be protected by one or more firewalls, passwords, secure embedded systems (OS kernel, CPU, memory), passwords, cryptography schemes, etc. to substantially prevent illegal tampering with government-issued registration and identification information loaded onto the system 400 that is mounted or otherwise coupled to the vehicle.

In this variation, the vehicle identification application can be national-, state-, or local government-specific such that various government entities can issue customized vehicle identification applications tailored to the rules, regulations, registration procedures, needs, etc. of each national, state, or local government. In one example, states can set different font sizes or typefaces, define placement of license plate numbers and registration tags, provide special templates or designs, or define any other formatting or stylistic property of visual content rendered on the display 410 through the vehicle identification application. In another example, state governments can set automatic registration protocols, such as how registration requests are routed to a department of motor vehicles server and how a digital registration "sticker" is transmitted back to the system 400 as a vehicle identification information update. In a further example, local governments can set how or when vehicle identification information is installed on the system 400, such as during manufacture or assembly of the system 400, when the system 400 is installed on a vehicle following delivery to a dealer, when the vehicle including the system 400 is first registered at a DMV, when the vehicle including the system 400 changes hands, and/or when an owner or user requests a license plate template change (e.g., standard to historic vehicle plate) or a change to vehicle registration (e.g., operational to non-op status, passenger to commercial vehicle status). In still another example, state governments can set triggers controlling transitions into the vehicle identification application, such as when the vehicle is within a preset range of an intersection, when the vehicle is within a preset range of a police officer, at specified intervals, when the vehicle is moving above a certain speed, when the vehicle is parked, when the vehicle is in a certain location, or given a trigger from a state-issued remote control device. However, national, state, and/or local governments can set any other relevant parameters of the vehicle identification application and/or the vehicle identification information rendered on the display 410 when the vehicle identification application executes. These parameters can also be modified or redefined over time, such as with updates for the vehicle identification application distributed to the system 400 via the remote server.

In one variation of the system 400, the user-elected application is an advertising application, wherein the display 410 renders the additional visual content that is an advertisement when the advertising application executes. In this variation, the user can select specific advertisements to render on the display 410. For example, the user who is a Giants baseball fan can select advertisements for tickets to Giants baseball games. In another example, the user that is a car dealership can select vehicle discounts and other dealership advertisements to be rendered on the display 410 when the vehicle is parked in a dealer lot. Additionally or alternatively, the user can elect certain advertising preferences or provide personal or demographic information that control which advertisements are rendered on the display 410. In one example, for the user who is a vegan, advertisements for fast food meat products are excluded from the advertising application executing on the system 400 mounted to the vehicle owner by the user. In another example, whitewater rafting trips are rendered on the display 410 for the user who enjoys outdoor activities. In yet another example, for the user who is a country music fan, a playlist for a local country music radio station is rendered on the display 410. In this variation of the system 400, the additional visual content is preferably targeted at a second user, individual, etc. outside of the vehicle. The second user, individual, etc. outside of the vehicle is also preferably within a field of view of the display 410 such that the advertisement is legible for the second user, individual, etc.

In this variation, the processor 440 can track advertisement exposure such that the user can be compensated for advertising products, goods, or services on the vehicle. In one example, the processor 440 tracks the amount of time an advertisement is displayed. In another example, the processor 440 is coupled to a camera and implements machine vision to identify and count the number of individuals who looked at display while the advertisement is rendered. In a further example, the system 400 implements global positioning to track the number of vehicles within a field of view of the display 410 while the advertisement is rendered. In this variation, the display 410 time or amount of exposure of the advertisement is preferably used to calculate the amount of user compensation for the advertisement. Distribution of funds, prizes, discounts, coupons, or other forms of compensation are preferably handled by the remote server that accesses an account of the user, fleet manager, vehicle owner, etc. to deposit the compensation to the user or other suitable entity.

In another variation of the system 400, the user-elected application is a road alert application, wherein the display 410 renders a road alert when the road alert application executes. In this variation, the display 410 preferably renders content substantially relevant to a second user outside of the vehicle, such as a second user who is following the vehicle in a second vehicle. The road alert application preferably informs the second user of upcoming road hazards, such as traffic conditions, accidents, potholes, construction, narrowed lanes, changes to a carpool lane or carpool lane restriction, onramps, or debris. Notification of tailgating, erratic driving, or dangerous behavior can also be provided to following vehicles. In one example implementation, the user elects the road alert application in order to inform trailing vehicles of upcoming traffic or road conditions, which can improve driving safety of the user by improving current traffic-related knowledge of other drivers around the user. In another example implementation, the second user, who is following the vehicle in a second vehicle, requests installation of the road alert application on the system 400 coupled to the vehicle. In this example implementation, the remote server preferably identifies the second user and/or the second vehicle that is/are proximal the user and/or the vehicle, such as through GNSS/GPS tracking or short-range communications. The remote server then preferably checks the application request against preferences of the user and uploads the road alert application to the system 400 when appropriate. Similarly, in an example implementation in which the road alert application is already installed on the system 400, the second user can supply an input (e.g., via a smartphone) to trigger a transition into the road alert application or to select particular road-related information to render on the display 410, such as 'traffic conditions for the next five miles.' Therefore, individuals or entities outside of the vehicle can substantially control an application installed on the system 400, a transition between two applications, and/or a selection of additional visual content rendered on the display 410 when the processor 440 executes the application.

In another variation of the system 400, the user-elected application is a driving direction application, wherein the display 410 renders a driving direction when the driving direction application executes. The driving direction application is preferably similar to the road alert application described above, wherein the system 400 displays information relevant to an individual outside of the vehicle. In this variation, the display 410 preferably depicts a driving direction for a second user driving behind the vehicle and within a field of view of the display 410 such that the second user does not need to remove his eyes from the road to view a driving direction. As described above, installation of the driving direction can be initiated by the user or requested by the second user. The second user also preferably requests directions to a destination, wherein the directions are handled by a remote server and pushed to the system 400 for presentation to the second user. The system 400 and/or the remote server can also identify additional vehicles proximal the second user and distribute driving directions across multiple vehicles followed by the second user over the course of the trip. However, the system 400 can implement the user-elected application that is a driving direction application in any other suitable way.

In another variation of the system 400, the user-elected application is a news application, wherein the display 410 renders a news alert when the news application executes. In this variation, the display 410 preferably renders local, state, national, or international current events, such as national political headlines or international economic headlines. Additionally or alternatively, the display 410 can render personal news or events related to the user or other individuals proximal the user, such as a news feeds, status update, message, or post sourced from a social network, blog, or other online service or network. For example, the display 410 can render a user status update that is "So excited—I just bought tickets for the Giants game tomorrow night," or "my friend Sammie just posted a new chili recipe to her cooking blog." In this variation, the display 410 can also render a visual pointer linking to the source of news content. For example, the display 410 can render a two-dimensional bar code, wherein an individual outside of the vehicle can user a smartphone implementing a camera to read the bar code and automatically access a news article, social network, blog, etc. from which the news content was sourced. Similarly, the communication module 430 can (wirelessly) output the pointer that is then accessed by a mobile electronic device carried by an individual outside of the vehicle to open the source of the news content.

In another variation of the system 400, the user-elected application is an interstate trucking application, wherein the display 410 exhibits the status of trucking certifications for the vehicle that is a commercial truck traveling across a state border. In this variation, the system 400 preferably interfaces with a local or global positioning system to track the location of the vehicle, such as when the vehicle crosses a state border and/or which roads the vehicle has covered. From this vehicle location information, the system 400 and the remote server preferably cooperate to pay required fees and taxes, submit required vehicle information (e.g., vehicle gross weight) to relevant authorities (e.g., a department of motor vehicles), and to render visually on the display 410 the current status of vehicle certifications and payments. For example, an RFID tag included in the communication module 430 can trigger an RFID reader proximal a highway near a state border, wherein the trigger informs the remote server that the vehicle has crossed a state border, and wherein the remote server subsequently pushes relevant vehicle and payment information to an appropriate authority and the display 410 renders visual indicators of the certifications and payment. In this variation, the trucking application is preferably installed on the system 400 by the user who is a fleet manager for a vehicle fleet including the vehicle such that the fleet manager can use the trucking application executing on a plurality of vehicles in the vehicle fleet to track and manage interstate trucking fees, payments, and certifications. However, in this variation, the trucking application can handle trucking certifications to the exclusion of application-specific or application-relevant visual content, wherein the system 400 does not update visual content rendered on the display 410 when the processor 440 executes the trucking application. However, the system 400 can function in any other way when executing the user-elected application that is a trucking application.

In another variation of the system 400, the user-elected application is a messaging application, wherein the display 410 renders a personal message when the messaging application executes. In this variation, the user preferably generates the personal message, and the message is preferably text-based, though the message can additionally or alternatively include a static image or video. The user can generate the message on a message generation website accessible on a computer and supported by the remote server, through a message generation application executing on a mobile electronic device carried by the user and supported by the remote server, through an onboard vehicle voice control system coupled to the system 400, or through any other suitable means. For example, the user can generate the message that is "Happy 17th Birthday, Tom," "Go Giants," or "Acme Moving Services—call 800.555.9876." Alternatively, the user can select the message from a predefined set of messages or download the message from a website, online user profile, social network, etc. For example, the user can download a "How's my driving? sign," a "Baby on Board" sign, a digital bumper sticker, or a background image for the display 410. Similarly, the user can pull the message from a social network post, comment, or message. However, the user can generate or select any other message including any other content for rendering on the display 410.

In another variation of the system 400, the user-elected application is a tollway application, wherein the system 400 handles toll payments for the vehicle passing through a tollbooth or toll plaza. Like the interstate trucking application described above, the system 400 executing the tollway application preferably monitors the location of the vehicle and/or communicates with a tollbooth or tollway to trigger a toll payment. The system 400 and/or remote server preferably interface(s) with the tollbooth or a toll management server to pay for the vehicle toll, and once the toll has been paid, the display 410 preferably renders visual content that indicates that the toll is paid. However, the tollway application can handle toll payments to the exclusion of visual content, wherein the system 400 does not change or update visual content rendered on the display 410 when the tollway application executes. However, the tollway application can function in any other way.

In another variation of the system 400, the user-elected application is a gaming application, wherein the display 410 renders gaming content when the gaming application executes. In this variation, the system 400 preferably enables gaming between the user and any other individual proximal the user. For example, the user in the vehicle can play a game with a second user in a second vehicle when the second vehicle is following the first vehicle, the user is facing a system 400 installed on the front of the second vehicle, and the second user is facing the system 400 installed on the back of the vehicle. In this example, the user can control the output of a second display on the second vehicle via a handheld electronic device, and the second user can control the output of the display 410 on the vehicle through a second handheld electronic device. Therefore, the system 400, installed on a plurality of vehicles, can enable a gaming platform or gaming interface for users occupying different but nearby vehicles.

The applications configured to execute on the system 400 are preferably created by third-party developers and hosted on the remote server such that the user can preview applications, select relevant applications, and install the relevant applications on the system 400 for subsequent use. The remote server preferably provides a software development kit (SDK) and/or hosts an application programming interface (API) to support application creation and development by the third-party developers. The third-party developers can represent government agencies (e.g., a state DMV), private institutions (e.g., a private toll plaza on a private highway, a retailer), or independent users. However, the system 400 and/or remote server can function in any other way to support development of applications that enable additional functionalities for the system 400.

Figure 5:
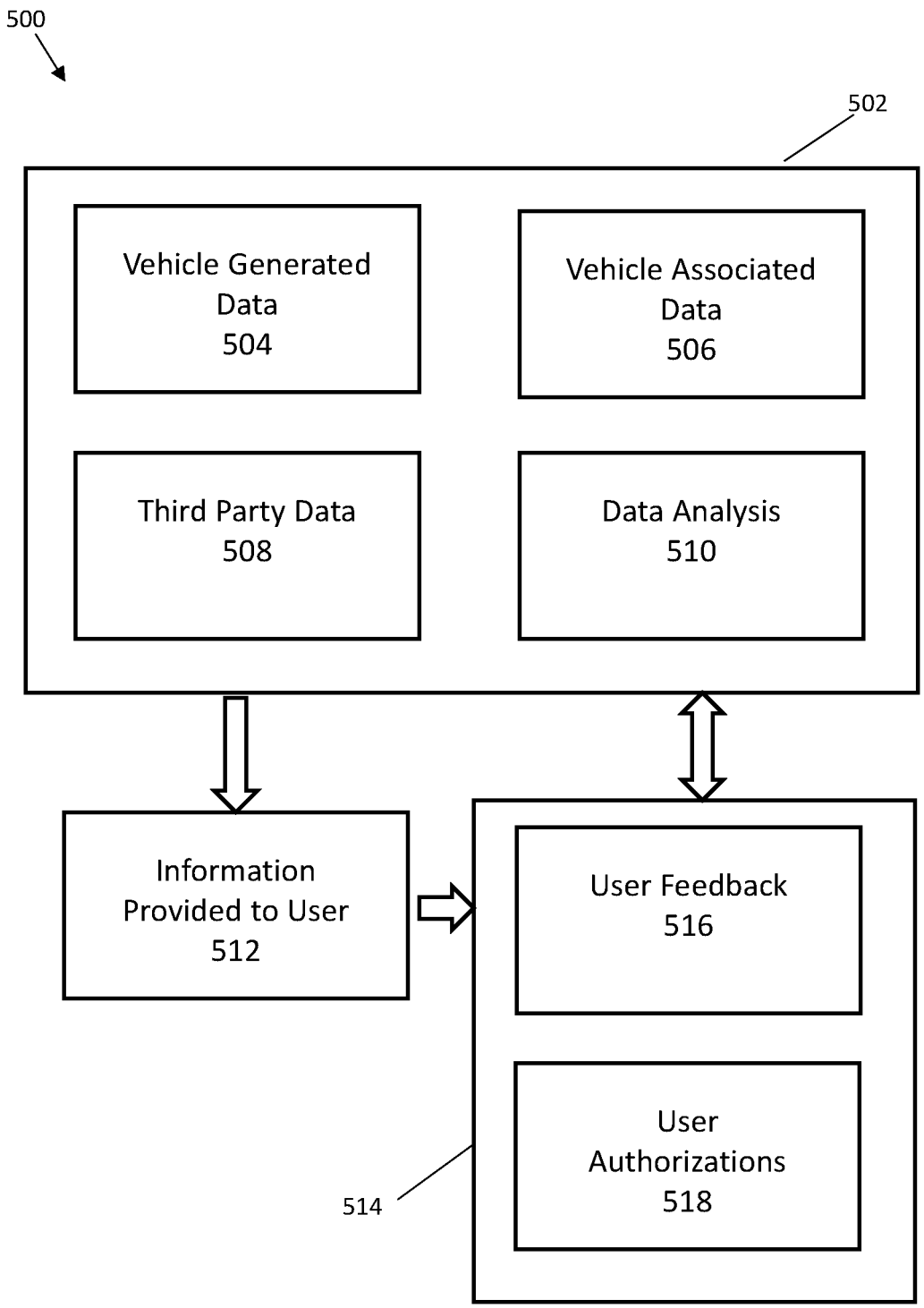
FIG. 5 illustrates various available types of data for the digital license plate system.

FIG. 5 schematically illustrates a data system 500 including various types or categories of data that is storable, analyzable, transmittable, or receivable by a digital license plate 502. Data can include vehicle generated data 504 that can be stored, directly sensed, derived, or calculated from vehicle sensors or data sources, and can further include sensors provided in the digital license plate 502 and any supporting electronics such as described in the disclosed embodiments. Other data categories can include vehicle associated data 506 (e.g. license information, registration, expiration date, insurance status, vehicle manuals, vehicle guides, or how-to information), third party data 508 (e.g. advertiser information, road tour guides, games, entertainment), or simulation or analysis data created by a data analysis module 510 (e.g. calculated tire or engine wear).

Data from digital license plate 502 can be provided to a user as information 512, typically via a smartphone application, text or email messages, vehicle dashboard screen, other, in-vehicle user interfaces, or web based interfaces (both in-vehicle or through a user's personal computer or laptop). Visual displays, printed information, audio, or any suitable user interface can be used to provide the information. Information can be provided in response to a query, as a warning announcement, or as a regular report. Information can be prioritized according to time or importance, with learning algorithms able to adjust a presentation to provide information in a form best suited for a user. For example, over time, items commonly requested by a user, or key performance indicators/warnings can be presented on a main screen rather than requiring menu selection or navigation to sub-screens.

User data 514 can include personal data, as well as user feedback 516 in response to information 512, or various commands, instructions, or authorizations 518 to allow access to or release of data from the digital license plate 502. Preset security levels can be set and authorized by a user, with modifications or changes being allowed. For example, a user might wish to invoke a privacy mode that prevents storage or release of vehicle location history or vehicle speed. In another example, data relevant to advertisers can be authorized for release in return for access to a third party web site, use of a smartphone application, or payment.

Vehicle generated data 504 can include but is not limited to that related to health of vehicle, display time and location of third party advertising images, gas mileage, road conditions (e.g. rough vs. smooth as detected by accelerometers), pothole identification, weather conditions, temperature, humidity, number of people riding in vehicle, amount of weight placed in the vehicle, braking habits, acceleration/deceleration habits, and location and timing information to support usage based insurance. Other data useful for monitoring a digital license plate can include digital license plate operational status, digital license plate battery status, camera readiness, memory usage, external battery (i.e. vehicle battery) charge availability, voltage levels, and self-test/monitoring results.

Other vehicle generated data can include information related to maintenance, including predictive maintenance based on data analysis 510 (e.g. "Please take me in for service soon, transmission is predicted to fail within the next month."). Expected maintenance costs can be provided, as well as information relating to maintenance history, and repaired or replaced parts.

Vehicle generated data can be combined with third party data 508, including that from vehicle conveyed electronic devices (e.g. personal smartphones or cameras), or third party insurance or vehicle databases to provide a wide range of information. This can include vehicle cost of ownership, readiness to purchase next vehicle: number of days since last purchase, mileage, gas usage and payment verification, cost comparison with last vehicle, cost comparison with a comparable third party vehicle, or cost comparison with a similar fleet vehicle. Financial information related to the vehicle such as percentage paid off on vehicle, days until paid off, or verification of insurance payments can also be provided.

Information (data with context) is presented to the customer, allowing them to generate their own insights. For example, weekend vehicle usage and costs can be compared and separated from weekday business usage, allowing a user to determine cost of recreational use of a vehicle or help reduce overall vehicle costs. Suggestions or recommendations can be made, for example, when and where to refill fuel (e.g. best results being on the weekend, at a low-cost gasoline station located in a direction opposite to a user's workplace, but near a restaurant well-liked by the user). Such information and "insights" (i.e. data based suggestions or recommendations) can be communicated simultaneously to the user, who can be further prompted for actions such as reminders to visit the restaurant and fill up with fuel on the trip home.

Alternatively, list of insights requiring action can be presented to the customer. Continuing the foregoing example, a prioritized list of nearby gasoline stations can be provided, along with recommended times to refill. For example, the digital license plate 502 can integrate data 504 (historical gas mileage), data 506 (recommended grade of vehicle gas), data 508 (location and reviews of gas stations), data 510 (calculated or simulated vehicle location) and user data 514 (user calendar provides available time and likelihood of visiting the restaurant based on recorded user habits) to provide a list of recommendations and resulting cost savings.

In another described embodiment, a digital license plate can directly or indirectly communicate with local entities capable of providing goods or services. For example, in one embodiment, a Bluetooth communication system on-board or connected to a digital license can communicate with a Bluetooth compatible beacon or communication system at a services station. As an example, fuel can be ordered and paid for, goods such as food and drink can be purchased, and local information requested by a digital license plate interacting with a service station. In operation, once a vehicle with a digital license plate stops moving (e.g. after maneuvering to to stop in front of the gas pump), it can activate and attempt to read nearby Bluetooth packets and associated signal strength. Signal strengths and Bluetooth packet are recorded and sent to a software purchase system. The software purchase system will identify the user, gas station and pump number. If signal strength is strong enough to determine a pump with a defined accuracy, a message will appear on the plate saying "Authorized! Please begin fueling from pump X." If the platform is unable to identify the pump the phone/plate will display "Please Move Vehicle Closer To Pump". After conclusion of refueling, the pump indicates completion of transaction and provides a digital receipt (or paper receipt at the pump, if requested). In effect, digital license plate mediated payment for fuel is possible using only information relevant to a gas station as determined using on board GNSS/GPS from the digital license plate; customer information as provided by the digital license plate database during setup; and fuel pump number, as determined using a set of pump associated beacons that transmit information to the digital license plate.

Figure 6:
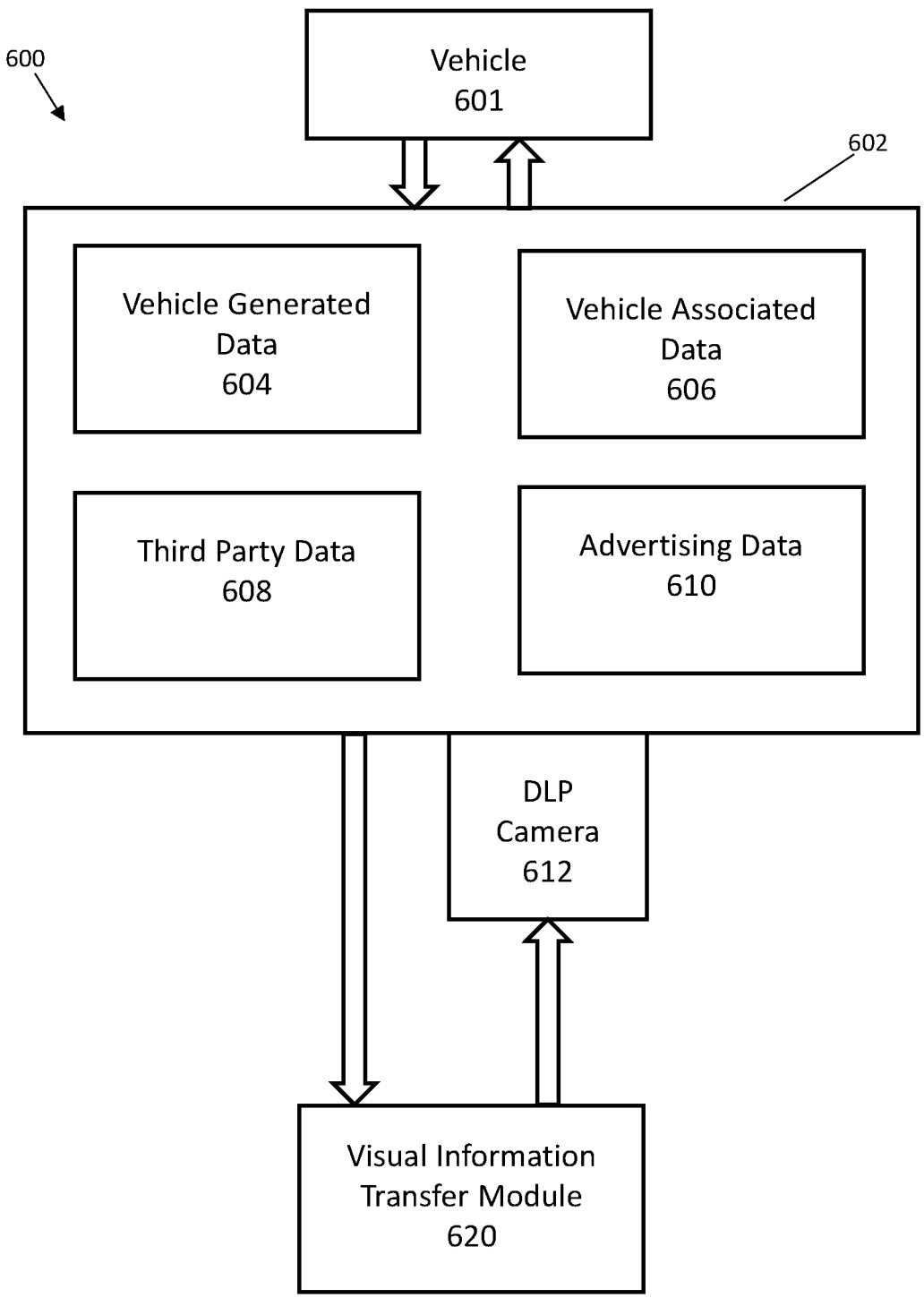
FIG. 6 illustrates data types suitable visual display.

As seen in FIG. 6, in certain embodiments a visual information transfer system 600 includes a vehicle 601 having at least one attachable digital license plate 602 and optional digital license plate camera 612 that can present various visual codes suitable for enabling or simplifying data interactions. These interactions can include but are not limited to providing information to a user or other person, providing information from a user to interact with the digital license plate, or provide a mechanism for operating, facilitating transactions, or enabling services that can be related to a vehicle or the digital license plate.

Information represented by these visual codes can be derived from vehicle generated data 604, vehicle associated data 606, third party data 608, or advertising data 610. For example, vehicle generated data could include mileage information or information for service providers relating to oil level, type, and time since last oil change. Vehicle associated data 606 could include a vehicle identification number (VIN) or owner address. Third party data 608 could include symbolic indicators that a parking fee has been paid to a third party, with a visually inspectable parking receipt being provided to the digital license plate by the third party. In other embodiments, a user or third party can provide advertising data 610 accessible via a visual code.

These visual codes can be, alone or in combination, text, symbols, colors, or electronically readable codes such as barcodes. Text can be rendered in font types that are easily recognized by electronic systems, and patterns or symbols can be high contrast and distinctive. Colors can be selected from a limited palette with widely separated color types to reduce risk of mistaking color in low or poor light conditions (e.g. at night, under sodium vapor lights). Barcodes can be numeric only (e.g. Interleaved 2 of 5, UPC-A, or UPC-E), alphanumeric (e.g. Code 128, Code 39, or US Government LOGMARS code), or 2-Dimensional (e.g. PDF417, Datamatrix, or QR code).

As previously discussed with respect to FIG. 4, since the digital license plate 602 can render a two-dimensional bar or QR code, an individual outside of the vehicle equipped with a smartphone having a camera can capture or read the bar code. This enables simplified access to data such as a news article, social network, blog, etc. from which the content was sourced. Other applications can include those related to vehicle operation or service, including but not limited to of vehicle start, vehicle stop, vehicle trunk open, vehicle gas cap release, door open, door close, vehicle hood open, and trunk open. For example, a vehicle can be left at a facility for oil change or cleaning service. Scanning the visual codes with a smartphone returns authorization information necessary to open the vehicle hood or car doors for service. This can even include limited authorization to start and move the vehicle within a restricted geographic area. Once service is complete, hoods or doors can be locked, and the vehicle owner remotely notified that the vehicle is ready for pickup.

In those embodiments of the visual information transfer system 600 supporting a digital license plate 602 having digital license plate camera 612, visual information (from visual information transfer module 620) can be transferred to the digital license plate 602. For example, a smartphone could initiate a two-way exchange of visual information with the camera equipped digital license plate. The digital license plate can read, for example, a QR code presented by the camera and initiate operations such as door opening. Alternatively, if wireless communication is not available, two-way transfer of substantial amounts of electronic information is still possible using bar codes or other information.

Figure 7:
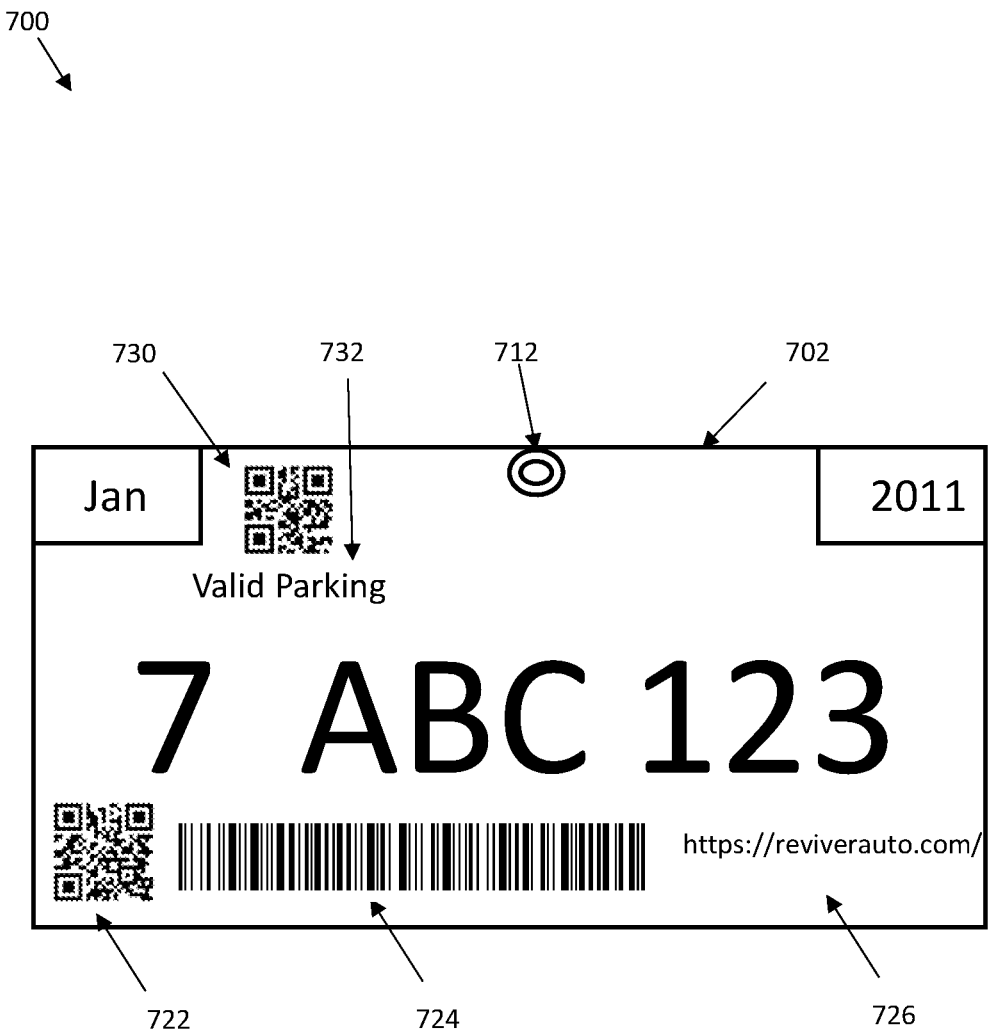
FIG. 7 illustrates a digital license plate displaying QR codes and other visual symbols.

FIG. 7 illustrates one embodiment of a digital license plate system 700 including a digital license plate 702 supporting a camera 712. As seen in FIG. 7, a two-dimensional (QR) bar code 722 is displayed, along with a standard one-dimensional bar code 724, and a textual hyperlink 726 presented in a font easily read by electronic devices such as smartphones. Various types of information can be presented, including hyperlinks (722, 724, 726) or parking permits (QR code 730 and text 732. This information is typically displayed only when a car is parked, in response to an electronic request, or when certain conditions such as detected location in a parking facility are true.

In certain embodiments, visual information can be remotely updated. In other embodiments, the information can be presented in response to a request. In still other embodiments, visual information between a camera equipped smartphone and a digital license plate can be interactive. For example, a smartphone can visually present (to a digital license plate equipped with a camera) a QR code requesting certain information. The digital license plate can receive and interpret the request, and if authorized, render a suitable response in text or as a bar code. Since this visual request/provide procedure can be continued, the system can support visual transfer of information without requiring a wireless connection. This can be advantageous, for example, in an environment with large numbers of digital license plates, or localities with extreme electromagnetic interference.

Figure 8:
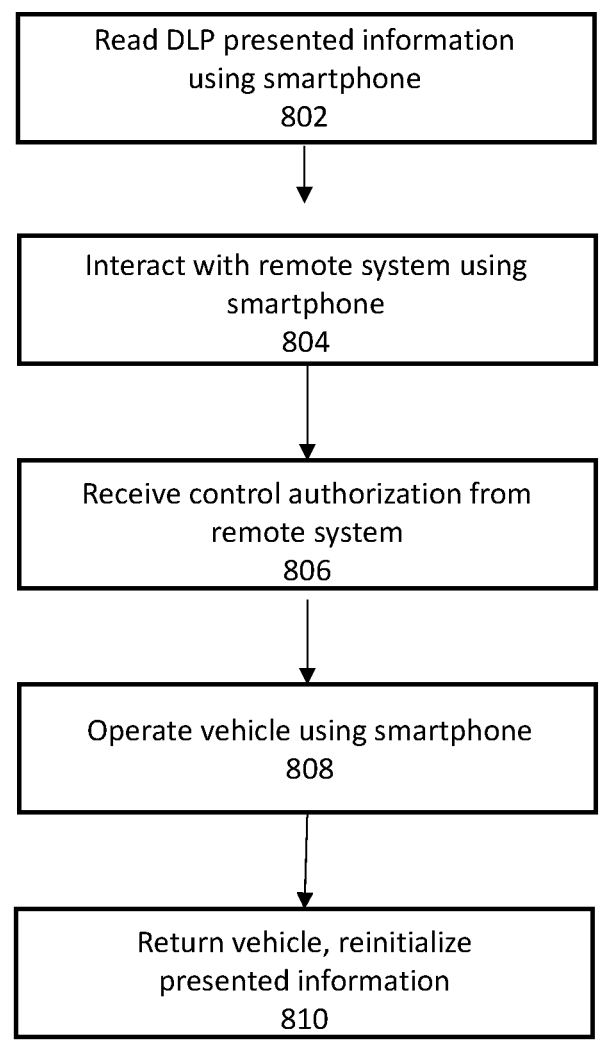
FIG. 8. illustrates a method for renting a vehicle.

FIG. 8 illustrates vehicle rental assisted by digital license plate presented information. In this scenario, in step 802 a user wishing to rent a vehicle without requiring assistance from a rental firm representative, enters a lot containing vehicles having digital license plates displaying vehicle related identifying information. Once the user identifies a suitable vehicle, the user can read the information using a smartphone equipped with a camera. In step 804, the smartphone remotely communicates with a server or cloud based system to transfer vehicle identification any rental payment authorization. In return, in step 806 the user receives smartphone authorization from the remote system. This information can be communicated wirelessly to the digital license plate in step 808 to operate the vehicle. In those embodiments in which the digital license plate is equipped with a camera, operation can be initiated by visual information. Operation can include, for example, opening a door to allow access to a key or electronic key fob, or authorization to allow vehicle start using a smartphone. When a vehicle is returned in step 810, the digital license plate can transfer mileage and fuel data to the smartphone for finalizing payment, and the display reinitializes to present information indicating identity and availability for rental.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A digital license plate attachable to a vehicle and comprising:
   a communication module for sending and receiving data;
   a display configured to present visual information including electronically readable visual information and human readable visual information;
   a camera; and
   a controller connected to the display, the camera, and the communication module, wherein the controller display and the camera to provide services, the controller is programmed to:

use the display and the camera to conduct a two-way exchange of information with the external device based on the user command;
use the camera to receive a user command on the external device; and
operate the vehicle based on the user command.

2. The digital license plate of claim 1 further comprising a location module for generating at least a location data based on a location of the digital license plate, wherein the location module includes at least one camera and a radionavigation system.

3. The digital license plate of claim 1 further comprising: a location module for generating at least a location data based on a location of the digital license plate a display, wherein the controller manipulates the communication module to send a request data to a server based on the location data and then receive a registration data from the server, the controller then selectively manipulates the display to present the visual information based on the registration data.

4. The digital license plate of claim 1, wherein the communication module is configured to receive an advertisement data, the controller then manipulates the display to present visual information based on the advertisement data.

5. The digital license plate of claim 4 further comprising a location module for generating at least a location data based on a location of the digital license plate, wherein the controller creates an advertisement exposure data based on the advertisement data and the location data.

6. The digital license plate of claim 1 further comprising a location module for generating at least a location data based on a location of the digital license plate, wherein the controller manipulates the communication module to send a payment data based on the location data, the controller selectively sends a message based on a confirmation data received by the communication module.

7. The digital license plate of claim 1 further comprising a location module for generating at least a location data based on a location of the digital license plate, wherein the communication module receives a news data, the controller manipulates the display to present visual information based on the news data and the location data.

8. The digital license plate of claim 1, wherein the controller manipulates the display to present a vehicle identifying visual information after the communication module receives a rental confirmation data.

9. A digital license plate system for operating a vehicle, comprising:
a user device configured to display a user command based on a user input;
a digital license plate including:
a communication module for wirelessly sending and receiving data;
a display;
a camera; and
a controller connected to, the display, the camera, and the communication module, wherein the controller is programmed to:
use the display and the camera to conduct a two-way exchange of information with the user device based on the user command;
use the camera to receive the user command on the user device;
wirelessly request an authorization from a remote system in response to the user command using the communication module; and
operate the vehicle based on the user command after receiving the authorization from the remote system.

10. A method of interacting with a vehicle, comprising the steps of: displaying a user command on a user device;
presenting visual information using the display of the digital license plate, wherein the visual information includes electronically readable visual information and human readable information;
using the display and a camera of the digital license plate to conduct a two-way exchange of information with the user device after receiving the user command;
using a camera of a digital license plate to receive the user command;
using a communication module of the digital license plate to wirelessly request an authorization from a remote system; and
operating the vehicle based on the user command after receiving the authorization from the remote system.

11. The method of claim 10, further comprising:
generating a location data based on a location of a digital license plate;
sending and receiving data using a communication module; and
providing services based on at least the location data;
wherein the step of generating the location data includes:
generating a surrounding image data using a camera; and
generating a radionavigation data using a radionavigation system.

12. The method of claim 10, further comprising:
generating a location data based on a location of a digital license plate;
sending and receiving data using a communication module;
providing services based on at least the location data;
sending a request data to a server based on the location data;
receiving a registration data from the server; and
using the display to present a visual information based on the registration data.

13. The method of claim 10, further comprising:
generating a location data based on a location of a digital license plate;
sending and receiving data using a communication module;
providing services based on at least the location data;
receiving an advertisement data using the communication module; and
using the display to present a visual information based on the advertisement data and the location data.

14. The method of claim 13, further comprising:
generating a location data based on a location of a digital license plate;
sending and receiving data using a communication module;
providing services based on at least the location data; and
creating an advertisement exposure data based on the advertisement data and the location data.

15. The method of claim 10, further comprising:
sending a payment data using the communication module;
receiving a payment confirmation data using the communication module; and
selectively sending a message based on the confirmation data.

16. The method of claim 10, further comprising:
generating a location data based on a location of a digital license plate;

sending and receiving data using a communication module;

providing services based on at least the location data;

receiving a news data using the communication module; and using the display to present a visual information based on the news data and the location data.

17. The method of claim 10, further comprising:

receiving a rental confirmation data using the communication module; and using the display to present a vehicle identifying visual information based on the rental confirmation data.

18. The method of claim 10 further comprising:

generating a location data based on a location of a digital license plate;

sending and receiving data using a communication module;

providing services based on at least the location data; and generating a user command based on a user input, wherein the step of providing services includes providing services based on the location data and the user command.

19. The digital license plate of claim 1, wherein the camera detects nearby vehicle information of a nearby vehicle, the controller processes the nearby vehicle information to determine an owner of the nearby vehicle and obtains information related to the owner of the nearby vehicle.

20. The digital license plate of claim 1, wherein wherein the camera measures ambient light proximal to the vehicle, the controller adjusts a brightness of the display based at least on the measured ambident light by the camera.

21. The digital license plate of claim 1, wherein the camera obtains images of bystanders nearby the vehicle, the controllers determines how the bystanders observes the visual information based on the images taken by the camera.

22. The digital license plate of claim 1, wherein the controller is configured to control at least an element of the vehicle, the camera detects a second visual information on a nearby display, wherein the controller processes the second visual information and control the element of the vehicle based on the second visual information.

23. The digital license plate of claim 1, wherein the camera detects a second visual information on a nearby display, the controller processes the second visual information and controls the first visual information on the display presented based on the second visual information.

24. The method of claim 10, further comprising:

using the camera of the digital license plate to detect nearby vehicle information of a nearby vehicle; and processing the nearby vehicle information to determine an owner of the nearby vehicle and obtains information related to the owner of the nearby vehicle.

25. The method of claim 10, further comprising:

using the camera of the digital license plate to measure ambient light proximal to the vehicle; and adjusting a brightness of the display based at least on the measured ambident light by the camera.

26. The method of claim 10, further comprising:

using the camera of the digital license plate to detect a second visual information on a nearby display; and processing the second visual information and controlling an element of the vehicle based on the second visual information.

27. The method of claim 10, further comprising:

using the camera of the digital license plate to detect a second visual information on a nearby display; and processes the second visual information and controls the first visual information presented on the display based on the second visual information.

* * * * *